Oct. 21, 1941.                W. ELLIOTT                 2,260,174
                         COMBINATION CARRIER
                       Filed Feb. 12, 1940         2 Sheets-Sheet 1

INVENTOR.
                                               Wm. Elliott
                                  BY
                                                ATTORNEY.

Oct. 21, 1941.  W. ELLIOTT  2,260,174
COMBINATION CARRIER
Filed Feb. 12, 1940  2 Sheets-Sheet 2
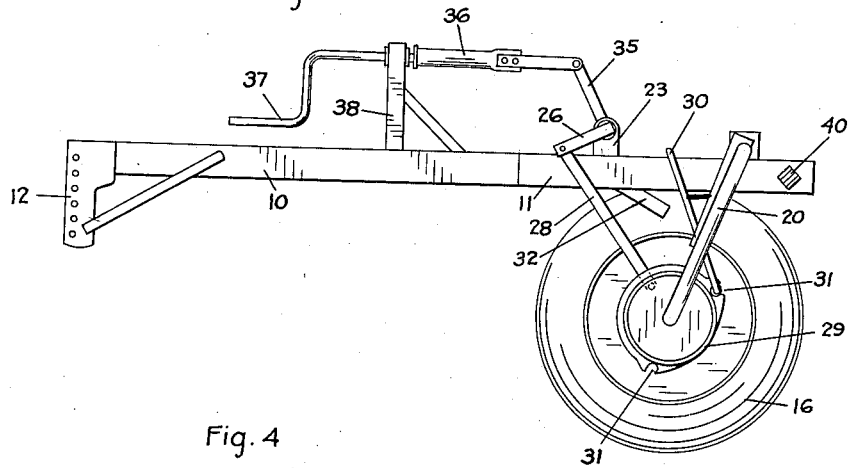
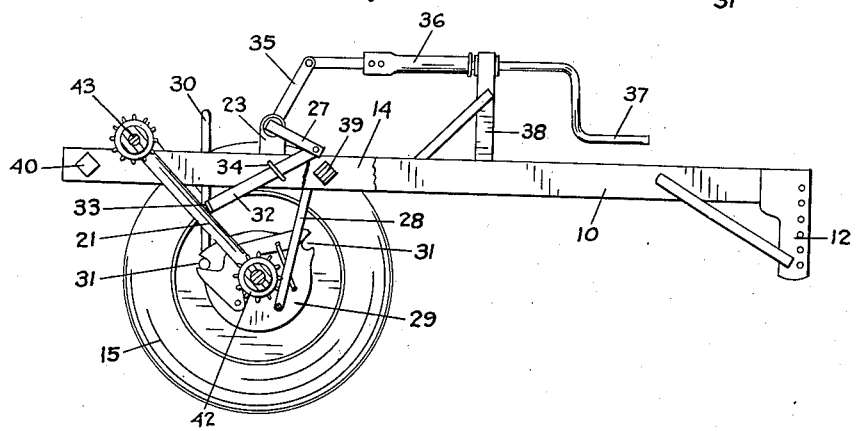
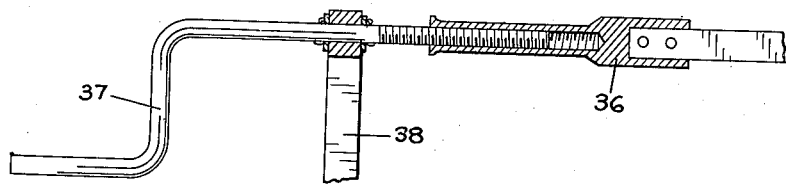
INVENTOR.
Wm. Elliott
BY
ATTORNEY.

Patented Oct. 21, 1941

2,260,174

UNITED STATES PATENT OFFICE 2,260,174

COMBINATION CARRIER

William Elliott, Beatrice, Nebr., assignor to Dempster Mill Manufacturing Company, Beatrice, Nebr., a corporation of Nebraska Application February 12, 1940, Serial No. 318,523

10 Claims. (Cl. 97—73)

My invention relates to carriers or implement frames adapted to be drawn by a tractor or the like and adapted for the attachment of any of a plurality of farm tools.

One of the objects of my invention is the provision of a rigid frame adapted for the rigid attachment of any of a plurality of tools and having a pivotal connection with the tractor for permitting the rigid frame to pivotally rise and fall in accordance with the surface character of the soil.

Another object is the provision of a wheel supported frame adapted for pivotal connection to a tractor or the like and having means for raising and lowering the frame relative to the supporting wheels and about the pivotal connection with the tractor.

A very important object of the invention is the provision of a rigid frame for a carrier of agricultural tools, the frame being supported on a pair of wheels which are connected by a crank axle for the raising and lowering of the frame through the arcuate movement of the crank axle by the traction of one only of the supporting wheels.

Another object is the provision of a carrier frame supported by a pair of wheels connected by a crank axle and having means for raising or lowering the frame through the traction of one of the supporting wheels, together with a prop which is automatically operable to relieve the crank axle of the torsional stresses during the operative travel of the carrier frame.

Another object is the provision of a carrier frame supported by a pair of wheels connected by a crank axle and means operable to cause the arcuate movement of the crank axle to raise or lower the frame, together with manually adjustable means for increasing or decreasing the range of the arcuate movement of the crank axle.

Another object of the invention is the provision of a carrier having a pair of rigid transverse bars for the attachment of any of several agricultural tools and having means for raising the carrier with the tools into inoperative position and for lowering them into operative position, the means being applied only at one side of the carrier whereby the stresses are exerted torsionally to lower or raise the opposite side of the carrier.

Another object is the provision of a farm implement carrier which is supported on a pair of wheels having a transversely positioned crank axle and having a clutch on only one end of the crank axle and having means at the opposite end of the crank axle for synchronizing the raising or lowering movement of the carrier, together with means for relieving the torsional stresses in the crank axle.

Figure 3 is a view in side elevation of the combination carrier with the left-hand wheel removed but showing the supporting wheels in the position in which the tools are inoperative.

Figure 4 is a view of the combination carrier in side elevation with the right-hand wheel removed to disclose otherwise concealed structure, the view being that of the side opposite that of Figures 2 and 3 but showing the parts in their inoperative position.

Figure 5 is a sectional view of the manually operable mechanism for adjusting the position of the prop.

Figure 1:
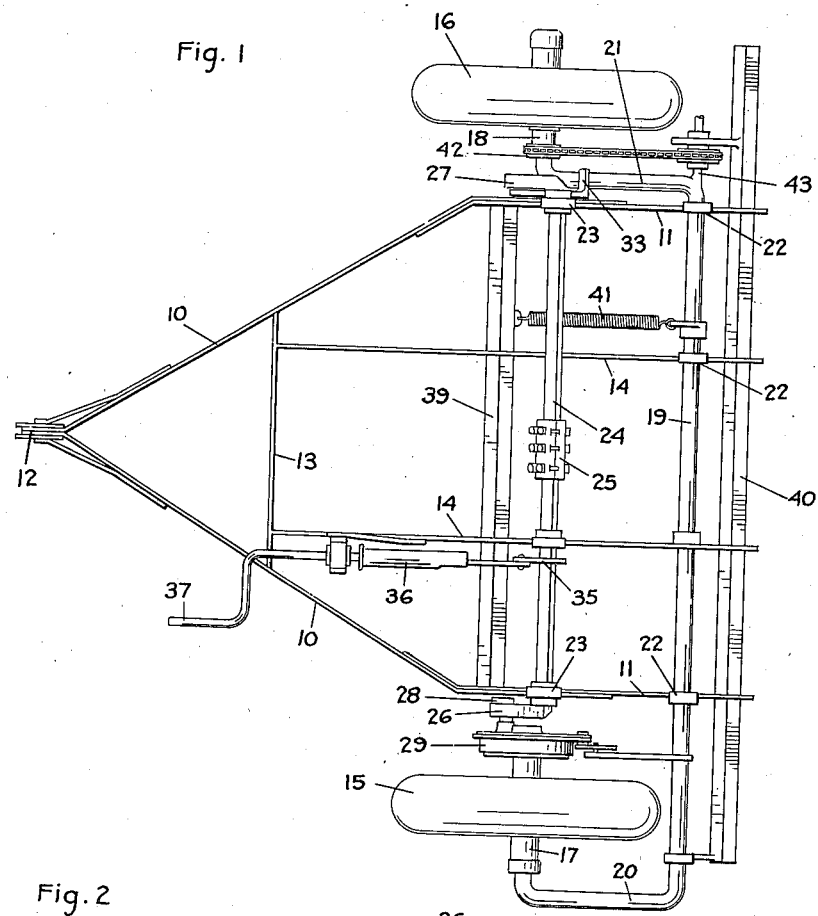
Figure 1 is a plan view of the combination carrier.

The implement frame includes two forwardly convergent beams 10 merging in the rear in parallel beams 11. A hitch 12 is provided at the apex of the convergent beams 10 for connection with a tractor or other suitable draft device. The rear portion of the beams 10 overlap the fore portions of the beams 11 for reinforcement of the frame at the axles. The strap 13 connects the two beams 10, and extending rearwardly from the strap 13 is a plurality of beams 14 similar to the beams 11. The straps 14 are welded to the strap 13 and they extend rearwardly, being provided in the rear end portions with apertures which are in alignment with each other and with similar apertures in the beams 11.

The implement frame is supported at its front end by the tractor or other draft device. Intermediate the front and rear are the supporting wheels 15 and 16, these wheels being in transverse alignment. The axles 17 and 18 of these wheels are part of a bail-like crank axle of a form having a horizontal portion 19 and a pair of side portions 20 and 21, the side portion 20 being outside the wheel 15 and the side portion 21 being between the wheel 16 and the implement frame. The portion 19 of the crank axle is journalled at 22 in the beams 11 and the straps 14 as best shown in Figure 1.

It will be apparent that the implement frame would travel at a constant level with respect to the wheels 15 and 16 except when the arms 20 and 21 are compelled to rotate with the wheels, in which case the implement frame may be raised or lowered.

The uprights 23 are secured firmly to the beams 10 and 11 at their overlapping portions. Journalled in these uprights is a square shaft 24 which, for convenience, in assembly, is formed of two like parts which are joined together by the clamp 25. The arms or levers 26 and 27 project forwardly and downwardly in the same plane from the opposite extremities of the square shaft 24. As will be explained subsequently, the square shaft 24 is normally held against turning during the raising or lowering operation. One end of a push rod 28 is pivotally secured to the free end of the arm or lever 26 while the opposite end of the push rod is connected to a clutch drum 29 to rotate eccentrically with relation to axis of the supporting wheels 15 and 16. The clutch 29 is of the type which is very common in use with power lift plows. During travel of the implement the clutch is idle, being held against rotation by a lever 30, the lower end portion of which has a pin engaging in either of two notches 31 for holding the clutch idle in the operative or inoperative position of the implement. The clutch may be actuated by a rope or the like connected to the lever 30 and extending to within convenient reach of the driver. Release of the pin from a notch 31 causes the clutch drum to rotate with the supporting wheel 15 to raise or lower the frame, the movements being automatically stopped when the pin engages the other of the two notches 31.

By employing only one clutch I avoid the difficulty of attempting to synchronize the simultaneous operation of two clutches which has been found to be almost impossible of satisfactory accomplishment and which results in increasing difficulties during the life of the implement. On the other hand, the use of a single clutch involves serious difficulties in operation and this has heretofore presented a problem which appeared to be impossible of solution. The upward thrust of the push rod 28 on the arm or lever 26 results in excessive torque on the shaft 24 and on the crank axle. This difficulty is especially great when my implement is equipped with soil working tools and used in soils of varying densities, when the torque on the shaft 24 and on the crank axle is subjected to numerous fluctuations. For minimizing and equalizing the torque, I employ the following described device.

Pivotally secured to the arm or lever 27 is a prop 32 which has a right angled extension 33 as best shown in Figures 1 and 4. A loop 34 guides the movement of the prop 32. The prop is adjustable in position but in any position of adjustment the extension 33 lies in the path of the arm 21 of the crank axle. In the lower position of the implement, the prop 32 bears against the arm 21 to materially reduce the torsional stresses in the shaft 24 and in the crank axle while the implement is in operation. In the elevated position of the implement as shown in Figure 3, the prop is idle and functionless, the torsional stresses being at their minimum.

Figure 2:
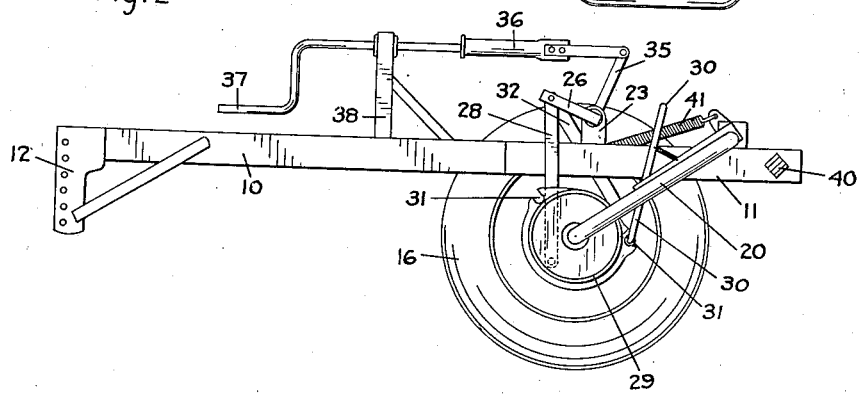
Figure 2 is a view in side elevation of the combination carrier frame with the left-hand wheel removed, the carrier being in the operative position or in the position in which agricultural tools carried by the carrier are in their operative position.

The prop 32 also provides means for the fine adjustment of the working depth of the tools carried by the implement frame. The turning of the shaft 24 in either direction will be communicated through the arm 27 to the prop 32 for any desired adjustment. Secured to the shaft 24 is a lever 35 which is actuated by a screw adjustment 36 having a crank handle 37, the screw adjustment being supported in a braced standard 38. The pitch of the screw 36, as shown in Figure 5, is such that it will not be affected by the vibration and the jarring of the implement. The screw adjustment is so fine that the working depth of soil working implements may be governed to within a fraction of an inch. The turning of the handle not only regulates the position of the prop 32 but it also acts through the push rod to adjust the position of the clutch as best seen by reference to Figure 2.

The implement frame further includes two transverse implement bars 39 and 40. A heavy counterbalancing spring 41 connects the portion 19 of the axle with the implement beam 39 for use in lifting and lowering the frame.

Some implements require the transfer of power as for operating seeding mechanism or the like. For this purpose, power is derived directly from the traction wheel 16 by means of a sprocket or other suitable wheel 42 having its axis of rotation in alignment with the wheel axis. This power is communicated by any suitable means to a wheel on the shaft 43 projecting from the part 19 of the crank axle. The shaft 43 is preferably welded to the part 19 of the crank axle in axial alignment therewith and it is braced to the bar 40 as shown in Figure 1. The power may thus be carried to the seed dropping mechanism or to any other operative mechanism carried by the implement frame.

From the foregoing description, it will be seen that the implement frame is of simple design without unnecessary parts. All parts are welded together to make the frame of integral construction and to eliminate all bolts which tend to work loose due to the vibration and jarring to which all soil working implements are subjected. Joints cannot work loose to throw the parts out of line as when rust and debris collect in bolted joints. The one-piece axle is properly supported at either end when the implement is in operation. The square beams 39 and 40 accommodate the clamping on of many farm units. The power lift is mounted with a ground wheel on a crank axle which is set forward from the center of the bearing of the axle so that when the power lift is tripped the wheel is locked to raise the implement and the implement frame is raised over center giving a very quick lifting action with a minimum stress on the power lift.

The depth adjustment has a wide range of depths and it is at the same time so sensitive that extremely small vibrations of depth are under control of the operator as the result of the screw adjustment. Tools which are clamped on the square bars 39 and 40 may be changed in forty minutes, thus giving the farmers a wide range of implements including listers, planters, seeders, bind weed eradicators, cultivators and numerous other implements. Since the tools are shiftable on the square bars and may be bolted in the desired position, they may be spaced from each other in the most effective manner. This is especially important with the arrangement of the lister bottoms for use in "middle-busting" so that the supporting wheels may travel in the furrows while the lister bottoms are centered on the ridges.

Having thus described my invention in such full, clear, and exact terms that its construction and operation will be readily understood by others skilled in the art to which it pertains, what

I claim as new and desire to secure by Letters Patent of the United States is:

1. A carrier adapted for connection to a tractor to be drawn thereby, a pair of wheels in transverse alignment, a crank axle journalled on said carrier and having said wheels journalled thereon at the extremities thereof, means for clutching one only of said wheels to said crank axle, a prop on said carrier at a point remote from said clutching means for engaging said crank axle for minimizing the torsional stresses in said crank axle during the operation of said carrier, and a single adjusting means for simultaneously adjusting the position of the clutching means and the position of the prop.

2. A carrier adapted for connection with a tractor or the like, a transversely positioned crank axle journalled on said carrier, means at one extremity of said crank axle for clutching said crank axle to the adjacent side of said wheels, means on said carrier adjacent the opposite extremity of said crank axle for engaging said crank axle to minimize the torsional stress on said crank axle, and a single manually operable means for simultaneously adjusting the operative position of both of said two last named means.

3. A carrier adapted for connection to a tractor to be drawn thereby, a pair of wheels in transverse alignment, a crank axle journalled on said carrier and having said wheels journalled thereon at the extremities thereof, means for clutching one only of said wheels to said crank axle, a prop on said carrier at a point remote from said clutching means for engaging said crank axle for minimizing the torsional stresses in said crank axle during the operation of said carrier, and means for simultaneously adjusting the position of said prop to control the height of said carrier with relation to the axis of said wheels, and the effective position of said clutch.

4. A carrier for agricultural implements, means for attachment of said carrier to a tractor or the like, a pair of supporting wheels for said carrier, a crank axle transversely positioned on said carrier and having said wheels journalled thereon, means for clutching said crank axle to one only of said wheels to cause a predetermined arcuate movement of said axle about the wheel axis for raising or lowering said carrier relative to said supporting wheels, manually operable means for adjusting said clutching means for limiting the arcuate movement of said crank axle, and means operative against said crank axle at a point adjacent the opposite of said wheels for relieving said axle of the torsional stresses while said carrier is in operation.

5. A carrier adapted for connection to a tractor to be drawn thereby, a crank axle journalled to said carrier, a pair of supporting wheels journalled on said crank axle at the extremities thereof, a clutch adjacent one of said wheels and adapted for clutching said wheels to said crank axle whereby the travel of said wheel will cause arcuate movement of said crank axle to raise or lower said carrier, and a push rod eccentrically secured to said clutch and bearing against said carrier.

6. A carrier adapted for connection to a tractor to be drawn thereby, a crank axle journalled to said carrier, a pair of supporting wheels journalled on said crank axle at the extremities thereof, a clutch adjacent one of said wheels and adapted for clutching said wheel to said crank axle whereby the travel of said wheel will cause arcuate movement of said crank axle to raise or lower said carrier, an adjustable shaft extending transversely of said carrier, a prop secured to said shaft and adapted to function as a stop to limit the downward movement of said carrier relative to said wheel, and means also secured to said shaft for determining the effective position of said clutch.

7. A carrier adapted for connection to a tractor to be drawn thereby, a crank axle journalled to said carrier, a pair of supporting wheels journalled on said crank axle at the extremities thereof, a clutch adjacent one of said wheels and adapted for clutching said wheel to said crank axle whereby the travel of said wheel will cause arcuate movement of said crank axle to raise or lower said carrier, a push rod eccentrically secured to said clutch and bearing against said carrier, a prop on said carrier and adapted to function as a stop to limit the downward movement of said carrier relative to said wheels and means for simultaneously adjusting both said prop and said push rod.

8. A carrier adapted for connection to a tractor to be drawn thereby, a crank axle journalled to said carrier, a pair of supporting wheels journalled on said crank axle at the extremities thereof, a clutch adjacent one of said wheels and adapted for clutching said wheel to said crank axle whereby the travel of said wheel will cause arcuate movement of said crank axle to raise or lower said carrier, a prop on said carrier and adapted to function as a stop to limit the downward movement of said carrier relative to said wheels, said prop bearing against said crank axle, and a single means for adjusting the position of said prop, and said clutch.

9. A carrier adapted for connection to a tractor to be drawn thereby, a crank axle journalled to said carrier, a pair of supporting wheels journalled on said crank axle at the extremities thereof, a clutch adjacent one of said wheels and adapted for clutching said wheel to said crank axle whereby the travel of said wheel will cause arcuate movement of said crank axle to raise or lower said carrier, a push rod eccentrically secured to said clutch and bearing against said carrier, and means for adjusting said push rod relative to said clutch to limit the arcuate movement of said crank axle.

10. A carrier and a crank axle positioned transversely thereof and journalled thereon, supporting wheels journalled on said crank axle at the extremities thereof, a transverse shaft journalled on said carrier, a pair of arms projecting angularly from said shaft, a clutch between said crank axle and one of said wheels for imparting arcuate movement to said crank axle for raising said carrier, a push rod pivotally secured at its extremities to said carrier and to one of said arms, a prop pivotally secured to the other of said arms and lying in the path of said crank axle, and a screw adjustment on said carrier for turning said shaft and thereby simultaneously adjusting both said prop and said push rod.

WILLIAM ELLIOTT.